United States Patent [19]

Tarnowski

[11] 4,300,147
[45] Nov. 10, 1981

[54] SYSTEM FOR ACCURATELY TRACING WITH A CHARGED PARTICLE BEAM ON FILM

[75] Inventor: Andrew A. Tarnowski, New Canaan, Conn.

[73] Assignee: Image Graphics, Inc., Fairfield, Conn.

[21] Appl. No.: 23,548

[22] Filed: Mar. 26, 1979

[51] Int. Cl.³ .............................................. G06F 3/14
[52] U.S. Cl. .............................. 346/159; 346/110 V; 346/158
[58] Field of Search ..................... 346/110 V, 158, 159

[56] References Cited

U.S. PATENT DOCUMENTS

| | | | |
|---|---|---|---|
| 2,847,580 | 8/1958 | Arvanetakis et al. | |
| 3,001,849 | 9/1961 | Walkup | 346/158 |
| 3,160,091 | 12/1964 | Schwertz | 346/158 |
| 3,205,301 | 9/1965 | Etcheverry, Jr. | 346/158 |
| 3,236,943 | 2/1965 | Möller | 346/110 V |
| 3,283,310 | 11/1966 | Hughes et al. | 346/158 |
| 3,409,906 | 11/1968 | Jones | 346/110 V |
| 3,445,655 | 5/1969 | Curry | |
| 3,488,496 | 1/1970 | Schneeman | |

*Primary Examiner*—Marshall M. Curtis
*Attorney, Agent, or Firm*—Bryan & Bollo

[57] ABSTRACT

A charged particle beam recorder having a curved film gate to impart a predetermined continuous curvature to the recording film. Predetermined tension is applied to the recording film to assure good contact of the film with the curved film gate and a motor is provided to intermittently advance the film through the film gate thereby providing fresh film for exposure. The positioning of the recording beam on the film is electronically corrected for the known geometric distortions introduced by the predetermined continuous curvature of the film gate and the predetermined tension of the film.

30 Claims, 4 Drawing Figures

SYSTEM FOR ACCURATELY TRACING WITH A CHARGED PARTICLE BEAM ON FILM

BACKGROUND OF THE INVENTION

This invention relates to charged particle beam recording on film and more specifically to a system for accurately tracing with an electron beam on an electron sensitive film. Such a system finds use in recording graphic images where a high degree of resolution and accuracy of placement is needed. Thus, electron beam recording is highly useful for, among other things, television recording, computer output microfilm, mass data storage, wide bandwidth signal recording, satellite photography, automated cartography, computer micrographics and seismic recording.

Essential elements of an electron beam recorder (EBR) are an electron gun, an electro-optical focusing and deflection system, an electron sensitive film and a film gate. In operation, the electron beam traces an image across the recording area on the emulsion side of a stationary film in the film gate. Because scattering and attenuation of the electron beam occurs in air, electron beam recording must be conducted in a high vacuum. Generally, a three stage vacuum system is used in electron beam recorders with the highest vacuum in the vicinity of the electron gun, a lower vacuum in the vicinity of the emulsion side of the film and the lowest vacuum in the vicinity of the back of the film. Such a three stage system allows relatively rapid access to the film for changing and replacement thereof. However, because of the differential pressure exerted on the film by the three stage system, buckling of the film occurs. This buckling is highly variable and unpredictable. Moreover, by placing the film in a vacuum, outgassing of water vapor and other atmospheric constituents is induced. This outgassing occurs at differential rates in the emulsion and film base and also results in a highly variable and unpredictable buckling.

It is recognized that positional uncertainties of the recording film are the primary limitations to the geometric accuracy of images recorded in high performance EBRs.

Conventional EBR film gates typically comprise an extremely flat platen surface which clamps the periphery of the film against a flat framing member. Due to the aforesaid buckling factors, although the film is fixed about the perimeter of the frame, it does not maintain good contact with the flat platen surface and an unknown and variable buckle is present in the film. For example, in the typical operation of a conventional large format EBR having a recording aperture of approximately 8×5 inches, the recording film may become spaced from the flat surface by anywhere from 0.010 to 0.030 inches in the central portion of the recording area. In other film recording systems operating at normal atmospheric pressure film buckle can be removed by the application of suction to the back of the film through small apertures in the flat surface of the film gate. However, such an approach is inapplicable in a vacuum system which is necessary for EBR operation.

The electron sensitive film used in EBR's conventionally includes a charge dissipating layer since film not provided with special charge dissipating means acquires a static electric charge when exposed to an electron beam. The electric field resulting from this static charge causes spurious beam displacements. By constructing the film gate from an electrically conducting material and maintaining the film in intimate contact with the film gate in accordance with the present invention, the electric field due to the static charge acquired by the film can be lessened without provision of auxiliary charge dissipating means. Because of the film buckling problem of prior film gates, they cannot achieve the intimate contact necessary to attain lessening of the electric field.

SUMMARY OF THE INVENTION

The present invention overcomes the disadvantages associated with prior film transportation mechanisms by providing a film gate which precisely positions the recording film along a predetermined continuous curvature. By so positioning the film all image distortions are predictable. These predictable distortions may be readily compensated for by conventional electronic methods. The result of such electronic compensation is an essentially geometrically distortionless image on the recording film.

It is an object of this invention to provide a film gate system for a charged particle beam recorder wherein the film is precisely positioned along a predetermined continuous curvature.

According to the invention the predetermined continuous curvature imparted to the film may be simple or compound, of fixed or variable radii, concave or convex, along the length or width of the film, or any other continuous curve configuration. However advantageously, if the curvature is made only along the length of the film, it is possible to apply a predetermined tension in the lengthwise direction of the film to hold the film in contact with the film gate. In applying a predetermined tension, any resulting stretching distortions of the recording film are predictable and may be compensated for by conventional electronic methods.

Therefore, it is a further object of this invention to provide a film gate system for a charged particle beam recorder wherein the film is held in contact with the film gate through predetermined tension.

By constructing the film gate of an electrically conducting material and by holding the film in intimate contact therewith, the electric field associated with any static charge acquired by the film is lessened. The need to provide special means of dissipating static charges on the recording film is thereby reduced.

Therefore, it is a further object of this invention to provide a film gate system which lessens the need to provide special means for dissipating static charge in the recording film.

It is convenient to apply the predetermined tension to the film through use of a conventional torque motor. However, tension may also be applied through other means including solenoids, negator or other springs, weights or tension arms. A suitable gear motor with brake is used to intermittently pull the film through the film gate for purposes of exposing fresh portions of film to the beam of charged particles.

Therefore, it is still a further object of this invention to provide a film gate system for a charged particle beam recorder wherein the film is intermittently pulled through the film gate for exposing fresh portions of film to the charged particle beam.

By curving the film gate convex relative to the incident charged particle beam and applying lengthwise tension to the film it is possible to eliminate all direct contact of the emulsion side of the film with the film gate. This avoids problems encountered with prior film gates relating to scratching and marring of the film's emulsion.

Therefore, it is still a further object of this invention to provide a film gate system for charged particle recording wherein the emulsion surface of the film makes no contact with the film gate.

BRIEF DESCRIPTION OF THE DRAWINGS

The above objects, aspects and advantages of the invention as well as others will become apparent from the detailed description of the preferred embodiment of the invention considered in conjunction with the drawings which should be construed in an illustrative and not in a limiting sense.

DETAILED DESCRIPTION OF THE DRAWINGS

Figure 1:
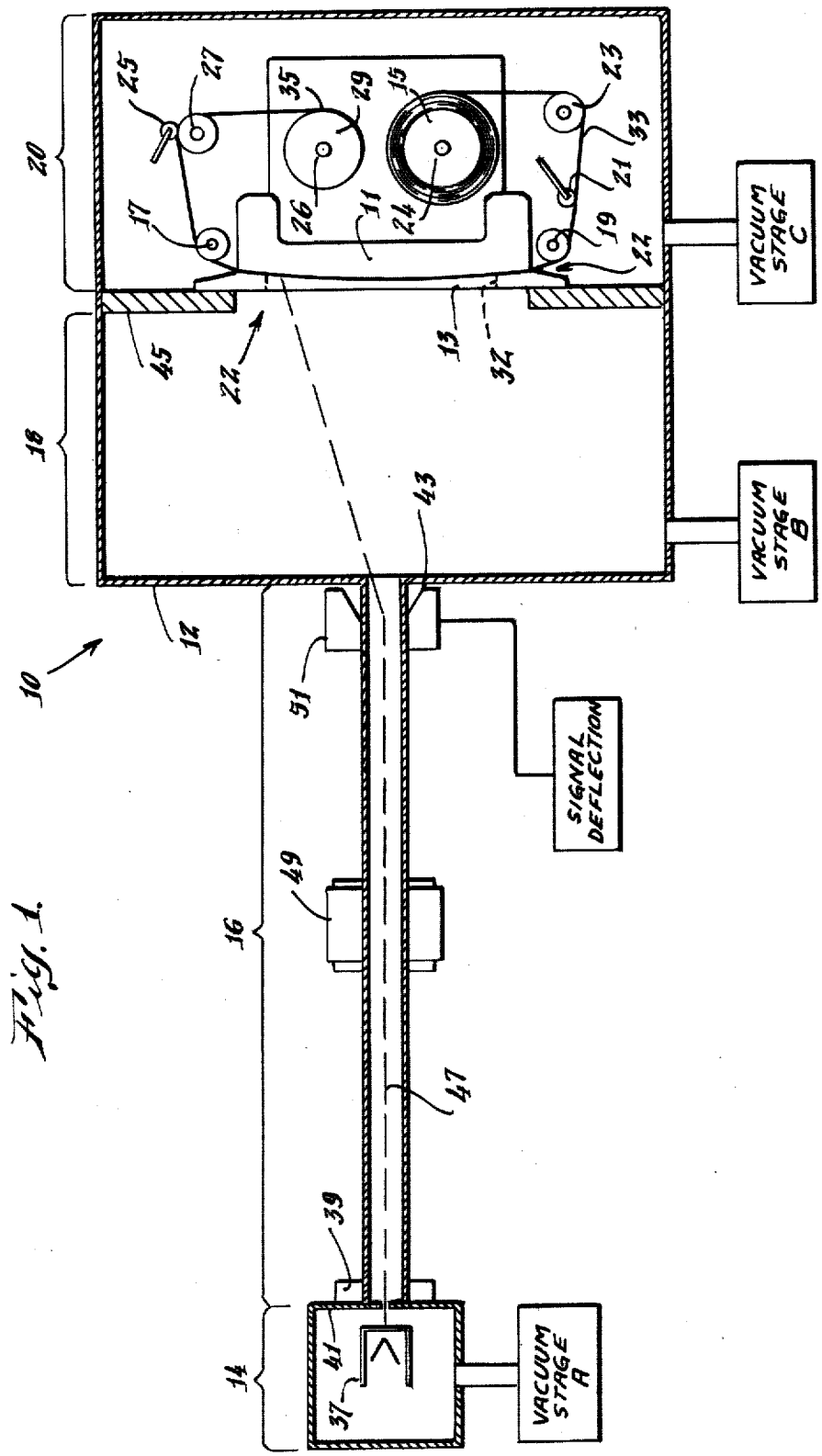
FIG. 1 is a schematic view of an electron beam recorder system in accordance with the present invention.

Referring to FIG. 1, a complete electron beam recorder is illustrated generally at 10. The complete electron beam recorder includes a vacuum housing 12 which is divided into four sections, 14, 16, 18 and 20 by partial walls 41, 43 and 45. Section 14 is reduced to a high vacuum by vacuum section A; section 16 and 18 are reduced to a lesser vacuum by vacuum section B; section 20 is reduced to a still lesser vacuum by vacuum section C. Vacuum in section A, B and C may be accomplished by conventional vacuum pumps.

Contained within section 14 is conventional triode electron gun with a directly heated thermionic emitter. An electron beam 47 is emitted from the electron gun 37 and passes through the aperture of partial wall 41 into section 16. Surrounding section 16 are conventional electromagnetic coils 39, 49 and 51. The electron beam 47 is centered as it passes through electromagnetic coils 39, focused by coil 49 and is deflected and aimed as it passes through coil 51. Through conventional electronic methods such as those discussed in *Building in CRT Pincushion Correction*, Electro-Optical Systems Design, March 1971, pp. 20–23, which is hereby incorporated by reference, the input signals to coil 51 are corrected for the known geometric distortions of the electron sensitive film 33 to thereby correct the trace produced by the electron beam 47 on the electron sensitive film 33 for such known distortions.

The electron beam 47 passes through section 18 and into section 20 where it strikes the recording film 33. Section 20 contains the film gate indicated generally at 22, which includes curved frame 13 and curved platen 11.

Figure 2:
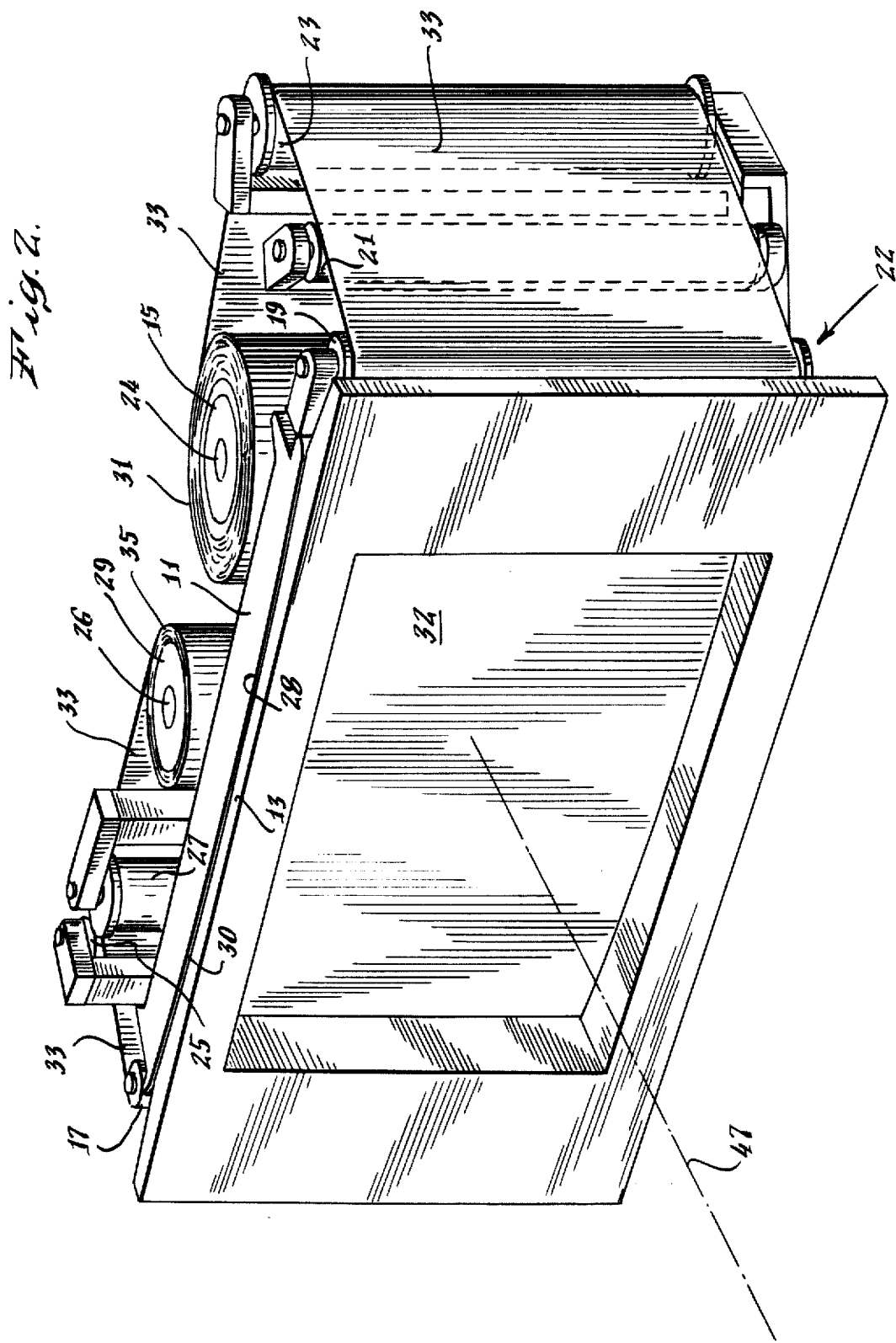
FIG. 2 is an enlarged perspective view of the film gate shown in FIG. 1.
Figure 3:
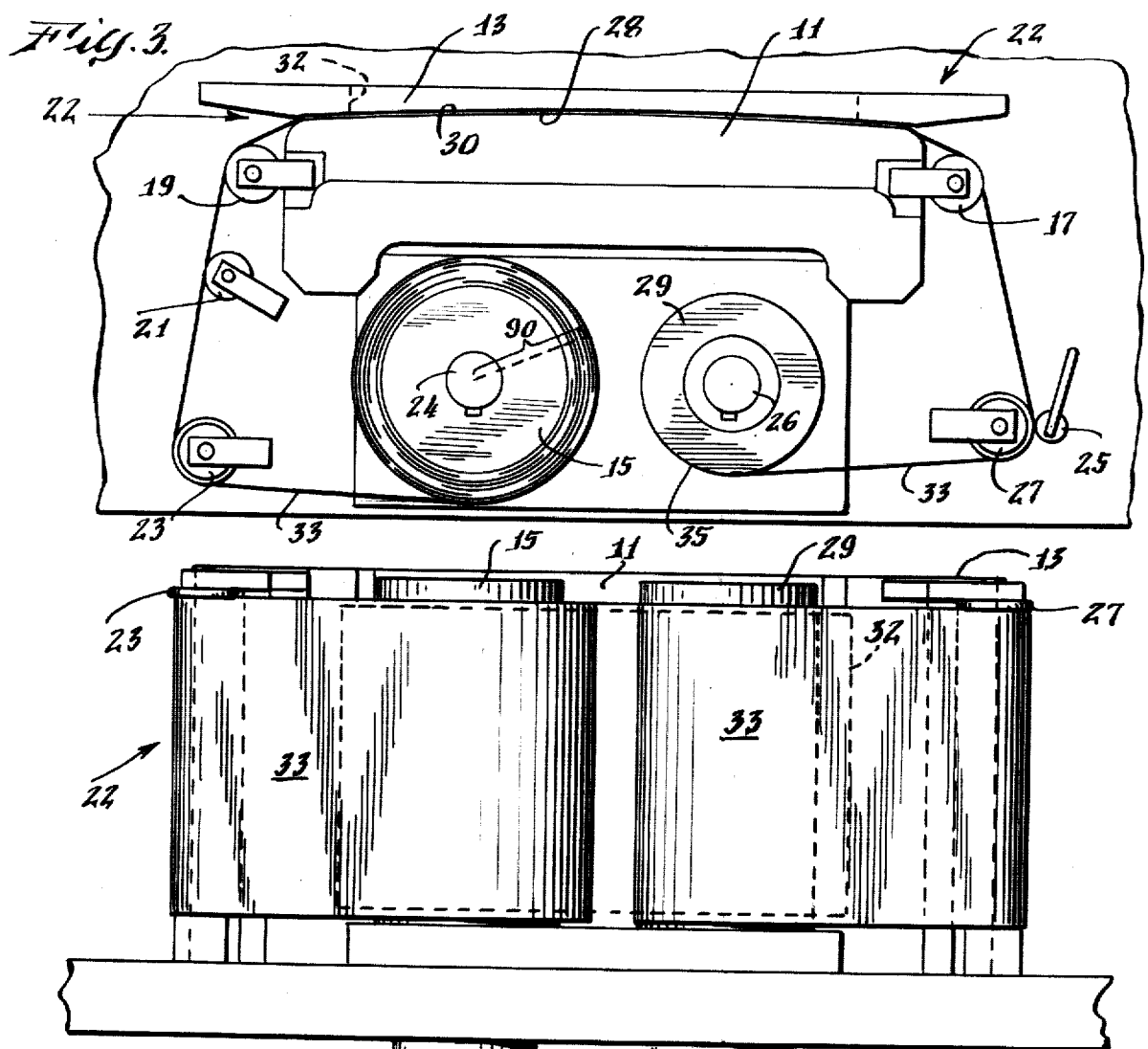
FIG. 3 is an enlarged plan view of the film gate of FIG. 1.

Referring to FIGS. 2 and 3, the film gate is indicated generally at 22. The electron beam 47 passes through the aperture 32 of the curved frame 13 and strikes the emulsion of the electron sensitive film 33. The electron sensitive film 33 is a conventional type such as that available from Eastman Kodak under the designation SO 219.

The electron sensitive film 33 is supplied by film supply reel 15 which is mounted on film supply shaft 24. The electron sensitive film 33 passes over roller 23, over out of film sensor 21 and over roller 19 before entering the film gate indicated generally at 22.

The electron sensitive film 33 enters the film gate indicated generally at 22 through passage between the curved frame 13 and the juxtaposed curved platen 11. The opposing surfaces 28 and 30 of the curved frame 13 and curved platen 11 are spaced such that the electron sensitive film 33 is relatively free to move along its length but is prevented from substantial motion towards or away from the electron gun 37. To facilitate the operation of the vacuum system, a spacing of approximately twice the thickness of the electron sensitive film 33 is appropriate.

The surface 28 of curved frame 13 and the surface 30 of curved platen 11 have substantially identical predetermined continuous cylindrical curvatures which are convex relative to the electron gun 37. Because of the close spacing of the surfaces 28 and 30, this predetermined curvature is imparted to the electron sensitive film 33 while in the film gate generally indicated at 22. The application of predetermined tension to the electron sensitive film 33 assures that the electron sensitive film 33 will maintain contact with surface 30 of the curved platen 11 and thereby further assures that the predetermined curvature of surface 30 will be imparted to the electron sensitive film 33. The position of the electron beam 47 is readily corrected to compensate for the predictable distortions of the recording film 33 caused by the predetermined curvature of the film gate and predetermined film tension.

While in the film gate generally indicated at 22, the electron sensitive film 33 is exposed, while stationary, to the electron beam 47 through aperture 32 of the curved frame 13. When conventional electron sensitive film is used, it has been found appropriate to use a radius of curvature of approximately 130 inches for the surfaces 28 and 30 of the curved frame 13 and curved platen 11.

Upon exiting the film gate generally indicated at 22 the electron sensitive film 33 passes over roller 17, passes between metering roller 27 and roller 25, and winds onto take up spool 29. Take up spool 29 is mounted on take up spindle 26.

Figure 4:
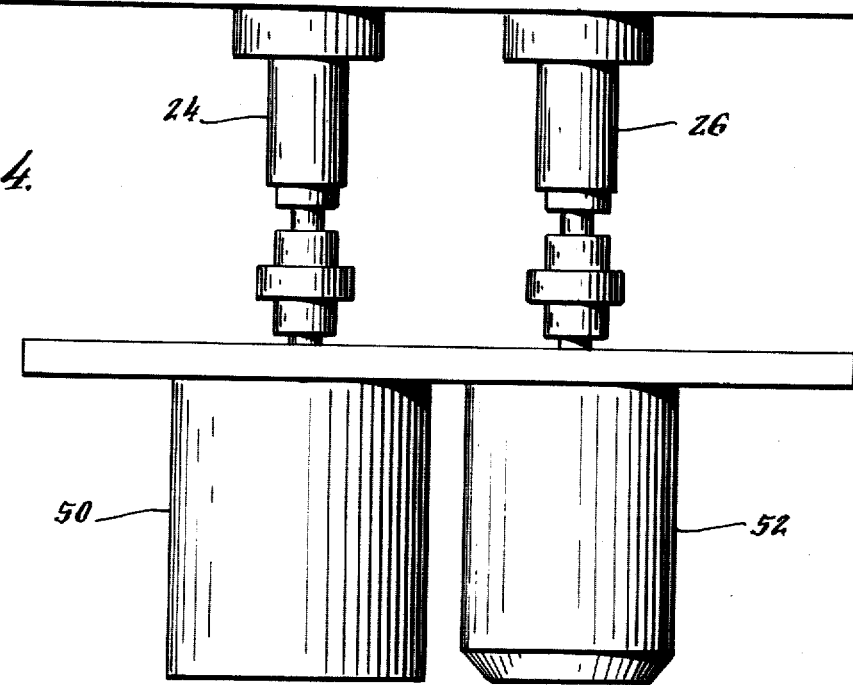
FIG. 4 is a plan view of the tension means used with the film gate of FIG. 1.

Referring to FIG. 4, means of applying tension to the recording film and means of advancing the film are illustrated. A conventional torque motor 50 is connected to film supply shaft 24 and causes a predetermined torque to be imparted to the film supply spool 15. This predetermined torque acting on the film, fixed by a conventional locked advance motor 52 coupled to take up spool 29, results in a predetermined tension on the electron sensitive film 33 which varies inversely with the radius 90 of the film on supply spool 15. As indicated previously, this predetermined tension assures that the electron sensitive film 33 will maintain good contact with the surface 30 of the curved platen 11. It has been found that when 5½ inch wide, 4 mil thick conventional film is used, a tension of approximately 20 ounces is appropriate.

The conventional advance gear motor with brake 52 is connected to take up shaft 26 and operates in an intermittent manner to draw a fresh area of electron sensitive film 33 through the film gate generally indicated at 22 prior to exposure. During exposure to the electron beam 47 the recording film is stationary. It is convenient to control the action of the advance motor 52 through conventional methods by use of metering roller 27.

It should be understood that the embodiment described herein is only illustrative of the present invention. It should be recognized by those skilled in the art that the invention may be practiced with any beam of charged particles including ions and protons. Those skilled in the art should further recognize that the curvature of the film gate may be of any continuous type and that the invention may be practiced with or without tensioning of the film.

What is claimed is:

1. A system for accurately tracing with a charged particle beam on film, comprising:
   (a) film gate means for receiving a film sensitive to charged particles, said film gate means having a portion with a predetermined continuous curvature to impart a predetermined continuous curvature to a portion of the film in said film gate means and provide controlled distortion of the film;
   (b) charged particle emission means for emitting a beam of charged particles, said charged particle emission means being positioned relative to said film gate means for exposing the film to the charged particle beam over at least a portion of said predetermined continuous curvature; and
   (c) transport means for intermittently moving the film within said film gate means in the direction of the length of the film for exposure to said charged particles when said film is stationary on said film gate.

2. A system for accurately tracing with a charged particle beam on film as claimed in claim 1, wherein:
   the radii of said predetermined continuous curvature are perpendicular to the direction of the width of the film.

3. A system for accurately tracing with a charged particle beam on film as in claim 1 wherein said transport means advances a predetermined length of said film within said film gate means.

4. A system for accurately tracing with a charged particle beam on film as in claim 3 wherein said transport means advances a predetermined length of said film within said film gate means.

5. A system for accurately tracing with a charged particle beam on film as claimed in claim 1, comprising:
   tension means for applying predetermined tension to the film in the direction of its length to hold the film in close contact with said predetermined continuous curvature of said film gate means.

6. A system for accurately tracing with a charge particle beam on film as claimed in claims 1, 2, 5 or 3, wherein:
   said predetermined continuous curvature is convex relative to the direction of the charged particle beam.

7. A system for accurately tracing with a charged particle beam on film as claimed in claims 1, 2, 5 or 3, wherein:
   said predetermined continuous curvature is concave relative to the direction of the charged particle beam.

8. A system for accurately tracing with a charged particle beam on film as claimed in claims 1, 2, 5 or 3, wherein:
   the charged particle beam is an electron beam.

9. A system for accurately tracing with a charged particle beam on film as claimed in claim 6, wherein:
   the charged particle beam is an electron beam.

10. A system for accurately tracing with a charged particle beam on film as claimed in claim 7, wherein:
    the charged particle beam is an electron beam.

11. A system for accurately tracing with a charged particle beam on film as claimed in claim 5, wherein:
    said film gate means is made of an electrically conducting material.

12. A system for accurately tracing with a charged particle beam on film, comprising:
    (a) curved platen means for confining a film sensitive to charged particles from substantial movement in a direction toward said curved platen means, said curved platen means having a platen surface with predetermined continuous curvature to impart a predetermined continuous curvature to a portion of the film in contact with said platen surface and provide controlled distortion of the film;
    (b) curved frame means for confining a film sensitive to charged particles from substantial movement in a direction toward said curved frame means, said curved frame means having a frame surface parallel with said platen surface, said frame surface being spaced relative to said platen surface such that the film may slide between said frame suface and said platen surface in the direction of its length and width, but is prevented from substantial movement in the direction of its depth;
    (c) a charged particle emission means for emitting a beam of charged particles positioned relative to said frame means to expose the film to the charged particle beam over at least a portion of said predetermined continuous curvature; and
    (d) transport means for intermittently moving the film past said frame surface and said platen surface in the direction of the length of the film for exposure to said charged particles when said film is stationary on said platen.

13. A system for accurately tracing with a charged particle beam on film as claimed in claim 12, wherein:
    the radii of said predetermined continuous curvature are perpendicular to the direction of the width of the film.

14. A system for accurately tracing with a charged particle beam on film as claimed in claims 12, 13 or 4, wherein:
    said predetermined continuous curvature is convex relative to the direction of the charged particle beam.

15. A system for accurately tracing with a charged particle beam on film as claimed in claim 14, comprising:
    tension means for applying predetermined tension to the film in the direction of its length to hold a portion of the film in a close proximity to said platen surface.

16. A system for accurately tracing with a charged particle beam on film as claimed in claim 15, wherein:
    said curved platen means is made of an electrically conducting material.

17. A system for accurately tracing with a charged particle beam on film as claimed in claims 12, 13 or 4 wherein:
    said predetermined continuous curvature is concave relative to the direction of the charged beam.

18. A system for accurately tracing with a charged particle beam on film as claimed in claims 17, comprising:
    tension means for applying predetermined tension to the film in the direction of its length to hold a portion of the film in close proximity to said frame surface.

19. A system for accurately tracing with a charged particle beam on film as claimed in claims 12, 13, or 4, wherein:

the charged particle beam is an electron beam.

20. A system for accurately tracing with a charged particle beam on film as claimed in claim 14, wherein:

the charged particle beam is an electron beam.

21. A system for accurately tracing with a charged particle beam on film as claimed in claim 15, wherein:

the charged particle beam is an electron beam.

22. A system for accurately tracing with a charged particle beam on film as claimed in claim 16, wherein:

the charged particle beam is an electron beam.

23. A system for accurately tracing with a charged particle beam on film as claimed in claim 17 wherein:

the charged particle beam is an electron beam.

24. A system for accurately tracing with a charged particle beam on film as claimed in claim 18, wherein:

the charged particle is an electron beam.

25. A system for accurately tracing with a charged particle beam on film as claimed in claim 21, wherein:
    (a) said predetermined continuous curvature is a cylindrical arc having a radius of curvature of approximately 130 inches; and
    (b) said platen surface is positioned from said frame surface a distance approximately twice the thickness of the film.

26. A system for accurately tracing with a charged particle beam on film as claimed in claim 25, wherein:

said predetermined tension is approximately 20 ounces.

27. A system for accurately tracing with a charged particle beam on film as claimed in claim 22, wherein:
    (a) said predetermined continuous curvature is a cylindrical arc having a radius of curvature of approximately 130 inches; and
    (b) said platen surface is positioned from said frame surface a distance approximately twice the thickness of the film.

28. A system for accurately tracing with a charged particle beam on film as claimed in claim 27, wherein:

said predetermined tension is approximately 20 ounces.

29. A method for accurately tracing with a beam of charged particles on a film sensitive to charged particles, comprising the steps of:
    (a) imparting a predetermined continuous curvature to a portion of the film to receive an electron beam;
    (b) generating a beam of charged particles carrying predetermined information;
    (c) positioning the predetermined continuously curved film portion relative to the beam of charged particles to be impacted thereby;
    (d) exposing the predetermined continuously curved film to the beam of charged particles; and
    (e) intermittently moving the film into stationary position for exposure of different portions thereof to a beam of charged particles.

30. The method as claimed in claim 29 wherein said step of imparting a predetermined continuous curvature to a portion of the film includes lengthwise stressing of said film for achieving contiguous contact with a continuously curved surface between said intermittent motions.

* * * * *